US012712374B2

(12) United States Patent
Sugihara et al.

(10) Patent No.: US 12,712,374 B2
(45) Date of Patent: Aug. 18, 2026

(54) POWER TRANSMITTING DEVICE

(71) Applicant: TOYODA GOSEI CO., LTD., Kiyosu (JP)

(72) Inventors: Atsushi Sugihara, Kiyosu (JP); Shinichiro Fuki, Kiyosu (JP); Yuki Tokuyama, Kiyosu (JP); Tomokazu Sakai, Kiyosu (JP); Takahiro Ito, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 812 days.

(21) Appl. No.: 18/063,108

(22) Filed: Dec. 8, 2022

(65) Prior Publication Data

US 2023/0208168 A1 Jun. 29, 2023

(30) Foreign Application Priority Data

Dec. 24, 2021 (JP) ................................ 2021-211246
Nov. 16, 2022 (JP) ................................ 2022-183570

(51) Int. Cl.
*H02J 7/80* (2026.01)
*H02J 50/10* (2016.01)
*H02J 50/40* (2016.01)

(52) U.S. Cl.
CPC ................ *H02J 7/80* (2026.01); *H02J 50/10* (2016.02); *H02J 50/402* (2020.01)

(58) Field of Classification Search
CPC ..................................................... H02J 7/0047

(Continued)

(56) References Cited

U.S. PATENT DOCUMENTS

2011/0285211 A1 11/2011 Endo et al.
2013/0300356 A1* 11/2013 Yang ....................... H02J 50/12 320/108

(Continued)

FOREIGN PATENT DOCUMENTS

JP H07-245888 A 9/1995
JP 5698599 B2 4/2015

(Continued)

OTHER PUBLICATIONS

Office Action mailed on Sep. 9, 2025 issued in corresponding Japanese patent application 2022-183570 (and English machine translation).

*Primary Examiner* — Ahmed H Omar
(74) *Attorney, Agent, or Firm* — Posz Law Group, PLC

(57) ABSTRACT

A power transmitting device is configured to perform contactless power supply using a power transfer signal to a power receiving device that supplies power to a power supply target. The power transmitting device includes a power transmitting antenna, a region indicator unit, and processing circuitry. The power transmitting antenna is configured to transmit a power transfer signal to the power receiving device. The region indicator unit emits a visible beam. Based on a transmitted power that is transmitted as the power transfer signal, the processing circuitry derives a power receivable region, in which the power receiving device is capable of receiving the power transfer signal as a received power greater than or equal to a specified threshold. The processing circuitry uses the region indicator unit to emit the visible beam toward at least a part of the power receivable region.

10 Claims, 5 Drawing Sheets

(58) Field of Classification Search
USPC .......................................................... 320/108
See application file for complete search history.

(56) References Cited

U.S. PATENT DOCUMENTS

| | | | |
|---|---|---|---|
| 2016/0127012 A1 | 5/2016 | Shylendra et al. | |
| 2016/0156388 A1 | 6/2016 | Zeine et al. | |
| 2016/0299210 A1 | 10/2016 | Zeine | |
| 2016/0299549 A1 | 10/2016 | Zeine et al. | |
| 2016/0300547 A1 | 10/2016 | El-Rukby et al. | |
| 2016/0301217 A1 | 10/2016 | Zeine et al. | |
| 2016/0301240 A1 | 10/2016 | Zeine et al. | |
| 2016/0301243 A1 | 10/2016 | Zeine et al. | |
| 2016/0301255 A1 | 10/2016 | Zeine | |
| 2016/0301256 A1 | 10/2016 | Zeine et al. | |
| 2016/0301258 A1 | 10/2016 | Zeine et al. | |
| 2016/0301259 A1 | 10/2016 | Zeine et al. | |
| 2016/0301264 A1 | 10/2016 | Zeine et al. | |
| 2017/0041046 A1 | 2/2017 | Shylendra et al. | |
| 2017/0141620 A1 | 5/2017 | Zeine et al. | |
| 2017/0141621 A1 | 5/2017 | Zeine et al. | |
| 2017/0187231 A1 | 6/2017 | Zeine et al. | |
| 2017/0187249 A1 | 6/2017 | Zeine et al. | |
| 2018/0019610 A1* | 1/2018 | Gu | H04B 1/3883 |
| 2018/0255596 A1 | 9/2018 | Zeine et al. | |
| 2018/0259615 A1 | 9/2018 | Zeine | |
| 2018/0366085 A1 | 12/2018 | Zeine et al. | |
| 2019/0020199 A1 | 1/2019 | Zeine et al. | |
| 2019/0140490 A1 | 5/2019 | Zeine et al. | |
| 2019/0157915 A1 | 5/2019 | Zeine et al. | |
| 2019/0197984 A1 | 6/2019 | Zeine et al. | |
| 2019/0199404 A1 | 6/2019 | Shylendra et al. | |
| 2019/0305604 A1 | 10/2019 | Zeine et al. | |
| 2020/0296780 A1 | 9/2020 | Zeine et al. | |
| 2020/0303954 A1 | 9/2020 | Zeine et al. | |
| 2021/0049975 A1 | 2/2021 | El-Rukby et al. | |
| 2021/0063525 A1 | 3/2021 | Zeine | |
| 2021/0249903 A1 | 8/2021 | Zeine et al. | |
| 2021/0249908 A1 | 8/2021 | Zeine et al. | |
| 2021/0321472 A1 | 10/2021 | Zeine et al. | |
| 2021/0373117 A1 | 12/2021 | Zeine | |
| 2022/0140630 A1* | 5/2022 | Song | G09G 3/002<br>320/108 |

FOREIGN PATENT DOCUMENTS

| | | | |
|---|---|---|---|
| JP | 2019-149851 A | 9/2019 | |
| JP | 6725531 B2 | 7/2020 | |
| JP | 2021129409 A * | 9/2021 | |
| KR | 20130124698 A * | 11/2013 | H02J 50/12 |

* cited by examiner

POWER TRANSMITTING DEVICE

BACKGROUND

1. Field

The present disclosure relates to a power transmitting device.

2. Description of Related Art

Japanese Patent No. 6725531 discloses a charger serving as a power transmitting device that performs contactless power supply to a wireless device, which is a power receiving device, using a power transfer signal.

Received power, or the power the power receiving device obtains from the power transfer signal, is correlated with the strength of the power transfer signal received by the power receiving device. The strength of the power transfer signal tends to be weaker as the distance from the power transmitting device increases. Therefore, when the power receiving device obtains a received power that is greater than or equal to a specified threshold so that contactless power supply is possible, a power receivable region, in which the received power is greater than or equal to the specified threshold, is limited to a certain range that includes the power transmitting device. In order to perform contactless power supply to a power receiving device, a user needs to put the power receiving device within the power receivable region. In such a situation, it is desirable that the user can easily recognize the power receivable region.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a power transmitting device is configured to perform contactless power supply using a power transfer signal to a power receiving device that supplies power to a power supply target. The power transmitting device includes a power transmitting antenna configured to transmit the power transfer signal to the power receiving device, a region indicator unit configured to emit a visible beam, and processing circuitry. The processing circuitry is configured to, based on a transmitted power that is transmitted as the power transfer signal, derive a power receivable region, in which the power receiving device is capable of receiving the power transfer signal as a received power greater than or equal to a specified threshold. The processing circuitry is also configured to use the region indicator unit to emit the visible beam toward at least a part of the power receivable region.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

<Configuration>

A power transmitting device 10 according to one embodiment will now be described.

<Contactless Power Supply System 1>

Figure 1:
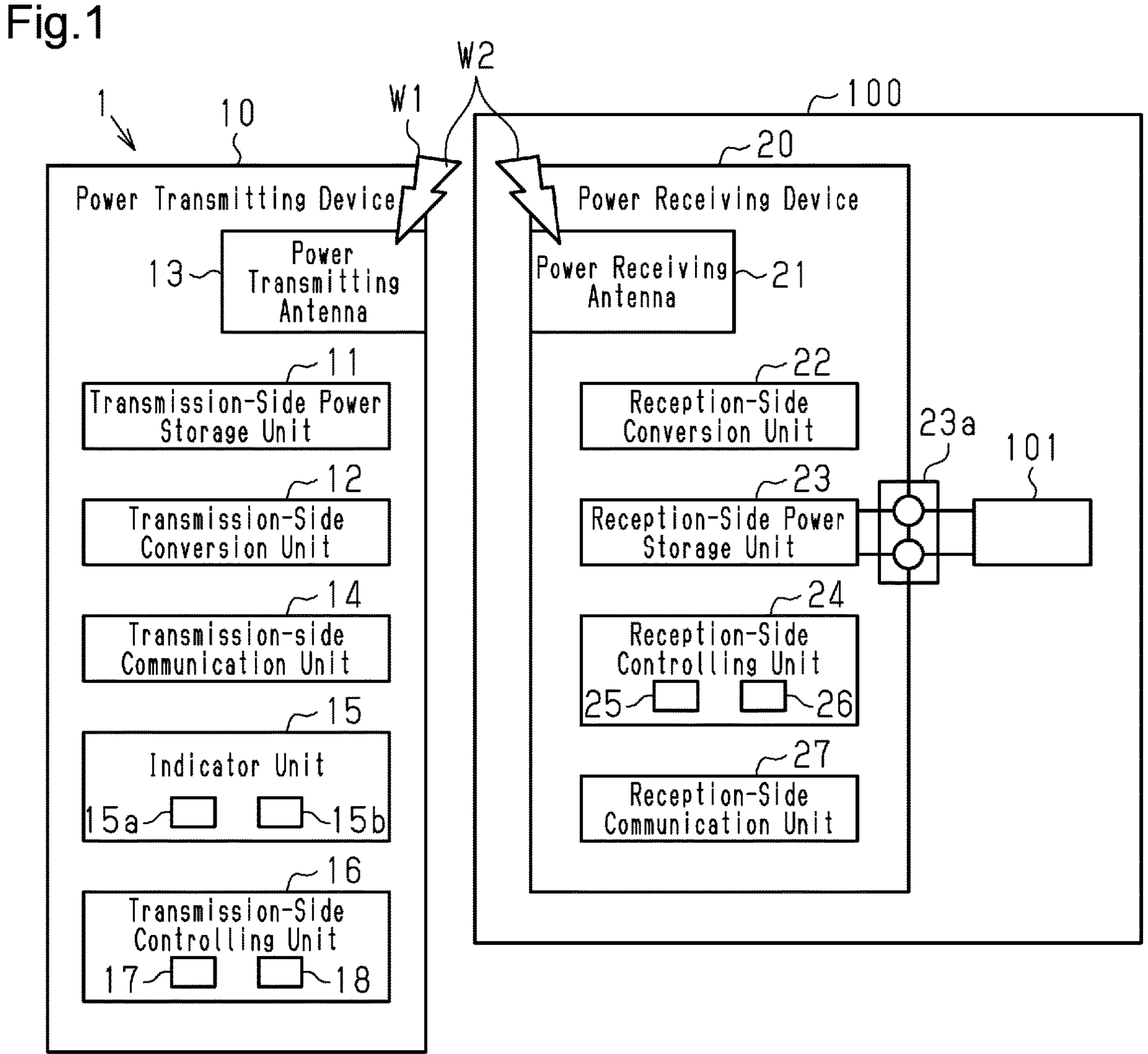
FIG. 1 is a schematic diagram showing a configuration of a contactless power supply system.

As shown in FIG. 1, a contactless power supply system 1 includes a power transmitting device 10, and one or more power receiving devices 20. In the present embodiment, the contactless power supply system 1 includes multiple power receiving devices 20. The contactless power supply system 1 is a system in which the power transmitting device 10 supplies power to the power receiving devices 20 through contactless power supply using a power transfer signal W1. The power transfer signal W1 is transmitted as a wireless signal from the power transmitting device 10 to each power receiving device 20. The power transfer signal W1 of the present embodiment includes microwaves. The power transfer signal W1 of the present embodiment does not include visible light. That is, the user cannot visually recognize or hardly visually recognizes the power transfer signal W1.

<Power Receiving Device 20>

The power receiving device 20 supplies power to a power supply target 100. Specifically, the power receiving device 20 supplies power to a device 101 in the power supply target 100. The power supply target 100 is a device that can be carried by a user. The power supply target 100 may be any object that can be supplied with power, such as a toy, a lighting device, a smartphone, or a wearable terminal. The power receiving device 20 is accommodated in the interior of the power supply target 100. The interior of the power supply target 100 is, for example, the interior of the casing (not shown) of the power supply target 100. The power receiving device 20 may be configured to be detachable from the power supply target 100. The specific configuration with which the power receiving device 20 is configured to be detachable from the power supply target 100 is not particularly limited. For example, the power receiving device 20 may be configured to be compatible with a battery of a specific standard. Examples of the specific standard include standards specified by International Electrotechnical Commission (IEC) and standards specified in Japanese Industrial Standards (JIS). For example, the power receiving device 20 may be configured to be compatible with a dry battery or a button battery. That is, the power supply target 100 may be configured to be operable regardless of whether the power receiving device 20 or a battery is installed therein.

The power supply target 100 of the present embodiment absorbs or reflects at least visible light. Accordingly, the user cannot visually recognize or hardly visually recognizes the power receiving device 20 accommodated inside the power supply target 100. The power supply target 100 of the present embodiment does not include a member that displays the charging status of the power receiving device 20. Therefore, the user cannot acquire or hardly acquires the charging status of the power receiving device 20 from the appearance of the power supply target 100.

The power receiving device 20 includes a power receiving antenna 21, a reception-side conversion unit 22, a reception-side power storage unit 23, a power supply terminal 23*a*, a reception-side controlling unit 24, and a reception-side communication unit 27.

<Power Receiving Antenna 21>

The power receiving antenna 21 is configured to receive the power transfer signal W1. The power transfer signal W1 of the present embodiment includes microwaves. Specific examples of the power receiving antenna 21 include a monopole antenna, a dipole antenna, a helical antenna, and a parabolic antenna. The power receiving antenna 21 converts the power transfer signal W1 into AC power. Also, the power receiving antenna 21 is configured to transmit and receive a communication signal W2. The power receiving antenna 21 may be a single antenna or an antenna array including multiple antennas. An antenna for transmitting and receiving the communication signal W2 may be provided separately from the power receiving antenna 21.

<Reception-Side Conversion Unit 22>

The reception-side conversion unit 22 converts the AC power output by the power receiving antenna 21 into received power P1. That is, the received power P1 is power that the power receiving device 20 has obtained from the power transfer signal W1. The received power P1 is DC power. Specific configuration of the reception-side conversion unit 22 is not particularly limited, and may include, for example, a rectifier circuit and a smoothing circuit.

<Reception-Side Power Storage Unit 23>

The reception-side power storage unit 23 is capable of storing power transferred through contactless power supply. The reception-side power storage unit 23 may be, for example, a rechargeable battery such as a lithium-ion battery or a capacitor. The reception-side power storage unit 23 stores part or all of the received power P1, which has been converted by the reception-side conversion unit 22. In this manner, power is supplied to the power receiving device 20 using the power transfer signal W1. The reception-side power storage unit 23 includes a battery management system (BMS), which is not illustrated. The BMS is configured to acquire information related to the charging status (state of charge: SOC) of the reception-side power storage unit 23. The information related to the charging status of the reception-side power storage unit 23 includes, for example, an output voltage, an input/output current, input/output power, a temperature, and a state of health (SOH) of the reception-side power storage unit 23. The information may include the charge information of the reception-side power storage unit 23. The charging status of the reception-side power storage unit 23 is synonymous with the charging status of the power receiving device 20.

<Power Supply Terminal 23*a*>

The power supply terminal 23*a* is connected to the reception-side power storage unit 23. The power supply terminal 23*a* is configured to be connected to the device 101. As a result, the power stored in the reception-side power storage unit 23 is supplied to the device 101, that is, the power supply target 100, via the power supply terminal 23*a*.

<Reception-Side Controlling Unit 24>

The reception-side controlling unit 24 includes a reception-side processing unit 25 and a reception-side memory unit 26. The reception-side processing unit 25 may include, for example, a central processing unit (CPU), a graphics processing unit (GPU), or a digital signal processor (DSP). The reception-side memory unit 26 includes a random-access memory (RAM) and a read-only memory (ROM). The reception-side memory unit 26 stores programs for operating the power receiving device 20. The reception-side memory unit 26 stores program codes or commands configured to cause the reception-side processing unit 25 to execute processes. The reception-side memory unit 26, which is a computer-readable medium, includes any type of medium that is accessible by a general-purpose computer or a dedicated computer. The reception-side processing unit 25 may include a hardware circuit such as an application specific integrated circuit (ASIC) and a field programmable gate array (FPGA). The reception-side processing unit 25, which is processing circuitry, may include one or more processors that operate according to a computer program, one or more hardware circuits such as an ASIC and an FPGA, or a combination thereof. The reception-side memory unit 26 stores identification information for identifying each of the power receiving devices 20. The identification information is, for example, the identification code of each power receiving device 20.

The reception-side controlling unit 24 is configured to obtain information indicating the charging status of the reception-side power storage unit 23 from, for example, the BMS of the reception-side power storage unit 23. The format in which the charging status is obtained is not particularly limited. In the present embodiment, the reception-side controlling unit 24 obtains the SOC of the reception-side power storage unit 23 as the charging status of the reception-side power storage unit 23. The SOC of the reception-side power storage unit 23 is regarded as the remaining power of the reception-side power storage unit 23. The reception-side controlling unit 24 is configured to obtain the received power P1 from, for example, the reception-side conversion unit 22. The reception-side controlling unit 24 is configured to output the obtained information to the outside.

<Reception-Side Communication Unit 27>

The reception-side communication unit 27 communicates with the power transmitting device 10, which will be discussed below, through transmission and reception of the communication signal W2. Specifically, the reception-side communication unit 27 demodulates the communication signal W2 received by the power receiving antenna 21, and outputs a demodulated signal to the reception-side controlling unit 24. Also, the reception-side communication unit 27 modulates information output by the reception-side controlling unit 24 and transmits the modulated information as the communication signal W2 from the power receiving antenna 21. The communication signal W2 of the present embodiment is implemented by a beacon signal. The mode of communication of the communication signal W2 may be any mode. Examples of such a mode include modes according to communication standards such as Bluetooth (registered trademark), Wi-Fi (registered trademark), or ZigBee (registered trademark). Further, the communication by the communication signal W2 may be performed by using the global positioning system.

<Power Transmitting Device 10>

The power transmitting device 10 performs contactless power supply to the power receiving device 20 using the power transfer signal W1. The power transmitting device 10 includes a transmission-side power storage unit 11, a transmission-side conversion unit 12, a power transmitting antenna 13, a transmission-side communication unit 14, at least one indicator unit 15, and a transmission-side controlling unit 16.

<Transmission-Side Power Storage Unit 11>

The transmission-side power storage unit 11 is a power source used to perform contactless power supply. The transmission-side power storage unit 11 may be, for example, a rechargeable battery such as a lithium-ion battery or a capacitor. An external power source (not shown) may be used instead of or in addition to the transmission-side power storage unit 11 as a power source used to perform contactless power supply.

<Transmission-Side Conversion Unit 12>

The transmission-side conversion unit 12 converts the power supplied from the transmission-side power storage unit 11 into an electric signal corresponding to the power transfer signal W1, and outputs the power transfer signal W1. The electric signal may be defined by any manner such as voltage, current, or power. The specific configuration of the transmission-side conversion unit 12 is not particularly limited. For example, the transmission-side conversion unit 12 includes circuitry including switching elements such as chopper circuits. Through control of the switching elements of the transmission-side conversion unit 12, the transmission-side conversion unit 12 outputs DC power supplied from the transmission-side power storage unit 11 as an electric signal of AC power. That is, the transmission-side conversion unit 12 functions as a DC/AC inverter.

<Power Transmitting Antenna 13>

The power transmitting antenna 13 is configured to transmit the power transfer signal W1 to the power receiving device 20. The power transmitting antenna 13 converts the electric signal output from the transmission-side conversion unit 12 into the power transfer signal W1 and transmits the power transfer signal W1. Specific examples of the power transmitting antenna 13 include a monopole antenna, a dipole antenna, a helical antenna, and a parabolic antenna. The power transmitting antenna 13 converts power output from the transmission-side conversion unit 12 into the power transfer signal W1 and transmits the power transfer signal W1 as a wireless signal. Accordingly, the power transmitting device 10 supplies transmitted power P2 to each of the power receiving devices 20. The transmitted power P2 is power transmitted as the power transfer signal W1. Specifically, the transmitted power P2 is power transmitted from the power transmitting antenna 13 to each of the power receiving devices 20 as the power transfer signal W1. Also, the power transmitting antenna 13 is configured to transmit and receive the communication signal W2. The power transmitting antenna 13 may be a single antenna or an antenna array including multiple antennas. An antenna for transmitting and receiving the communication signal W2 may be provided separately from the power transmitting antenna 13.

<Transmission-Side Communication Unit 14>

The transmission-side communication unit 14 demodulates and modulates the communication signal W2. Specifically, the transmission-side communication unit 14 demodulates the communication signal W2 received by the power transmitting antenna 13, and outputs the demodulated communication signal W2 to the transmission-side controlling unit 16, which will be discussed below. Also, the transmission-side communication unit 14 modulates information output by the transmission-side controlling unit 16 and transmits the modulated information as the communication signal W2 from the power transmitting antenna 13. Thus, the power transmitting device 10 and the power receiving device 20 are configured to communicate with each other via the communication signal W2. The communication signal W2 includes information related to the charging status of the reception-side power storage unit 23 and information related to the position of the power receiving device 20 with respect to the power transmitting device 10.

The information related to the charging status of the reception-side power storage unit 23 is, for example, information from which the BMS of the reception-side power storage unit 23 can be obtained. After the reception-side controlling unit 24 obtains the information related to the charging status of the reception-side power storage unit 23 from the BMS, the information is transmitted as the communication signal W2 from the power receiving antenna 21 via the reception-side communication unit 27. The power transmitting device 10 acquires the charging status of the power receiving device 20 by receiving the communication signal W2.

The information related to the position of the power receiving device 20 with respect to the power transmitting device 10 is used to derive the position of the power receiving device 20 with respect to the power transmitting device 10. Examples of the information related to the position of the power receiving device 20 with respect to the power transmitting device 10 include relative coordinates of the power receiving device 20 with respect to the power transmitting device 10, the received signal strength indicator (RSSI) of the communication signal W2 transmitted from the power receiving device 20, and image data including the power transmitting device 10 and the power receiving device 20.

<Indicator Unit 15>

The indicator unit 15 emits visible beams L. The indicator unit 15 includes a light source of the visible beams L. The specific configuration of the light source is not particularly limited, and may be, for example, an incandescent lamp, a fluorescent lamp, a light-emitting diode (LED), or a laser light source.

Figure 2:
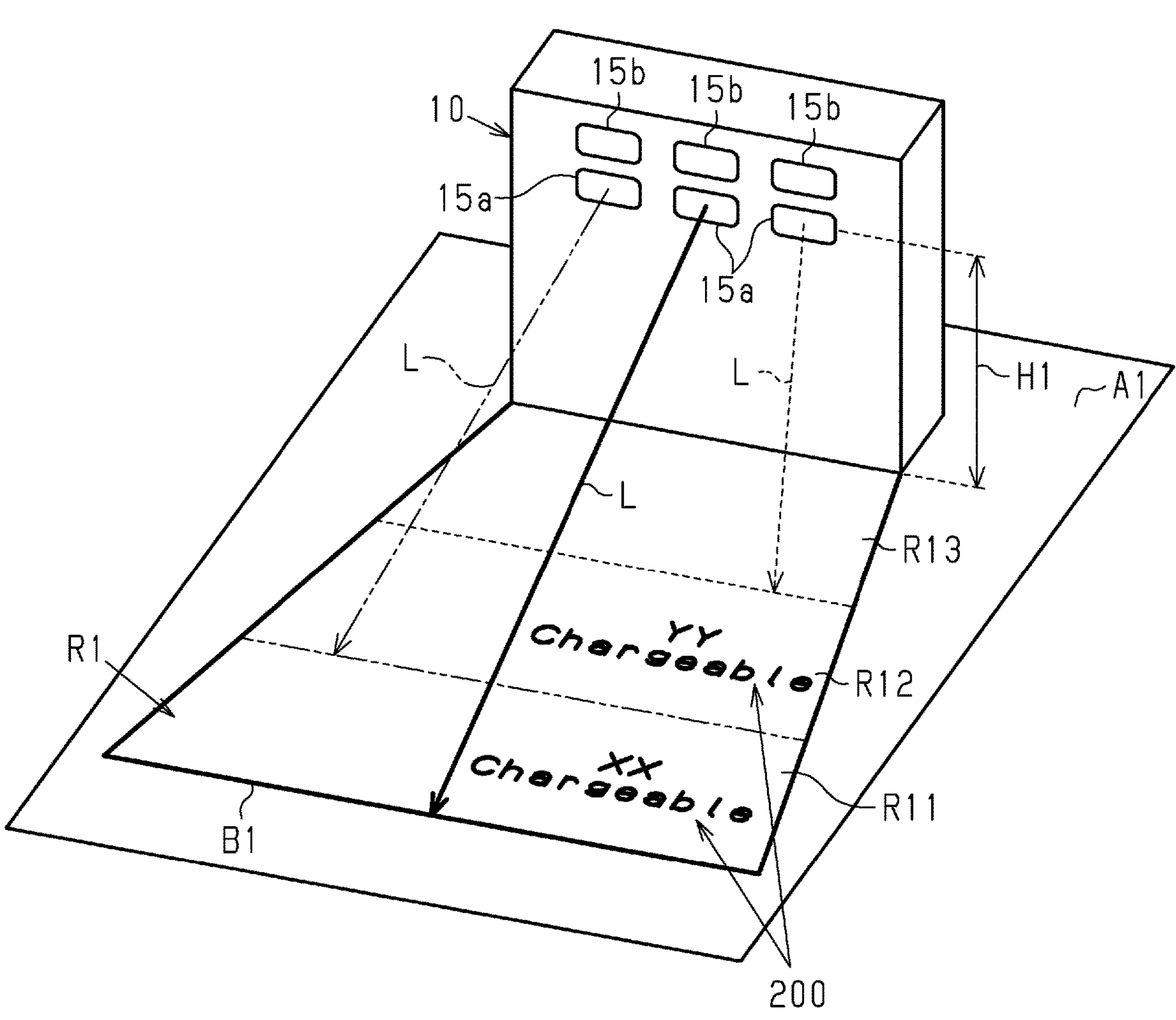
FIG. 2 is a diagram showing a state of emission of visible light by region indicator units.
Figure 3:
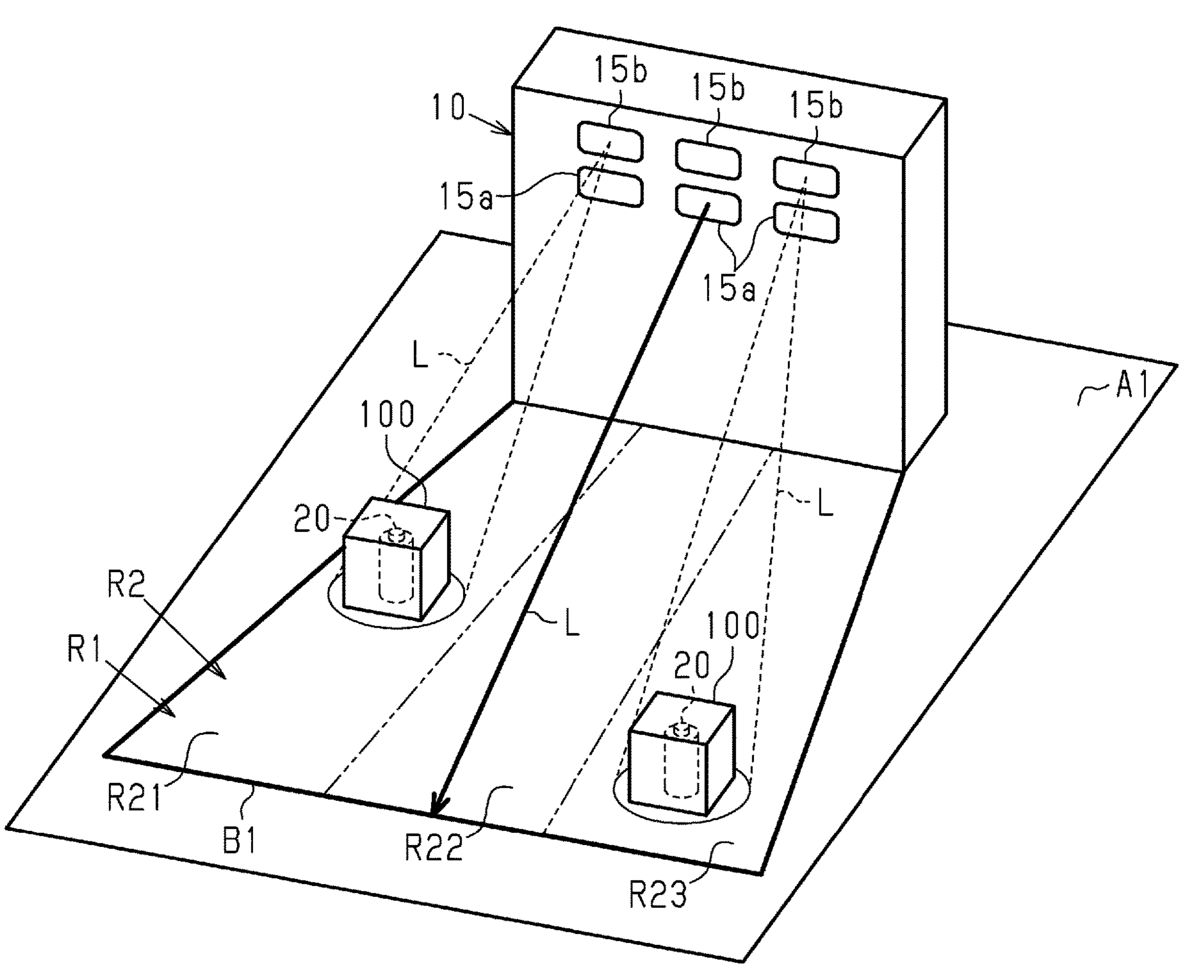
FIG. 3 is a diagram showing a state of emission of visible light by target indicator units.

As shown in FIGS. 1 to 3, the indicator unit 15 includes one or more region indicator unit **15*a* and one or more target indicator unit 15*b*. That is, the power transmitting device 10 includes one or more region indicator units 15*a* and one or more target indicator units 15*b***.

<Region Indicator Unit **15*a***>

As shown in FIG. 2, the region indicator units **15*a* are configured to emit the visible beams L to a power receivable region R1. The region indicator units 15*a* are configured to change a mode in which the visible beams L are emitted. The emission modes of the visible beams L include at least one of the intensity of the visible beams L, the color of the visible beams L, and the emission time of the visible beams L. The region indicator units 15*a*** of the present embodiment are configured to emit the visible beams L in different colors. The specific mode in which the visible beams L of different colors are emitted is not particularly limited. For example, optical elements such as liquid crystals, fluorescent bodies, refractile bodies, or diffraction gratings may be used.

The region indicator units 15*a* are configured to change an emission directions of the visible beams L. The emission direction can be changed by controlling the optical system of the region indicator units 15*a*, for example, the directivity of the light sources or the angles of mirrors. In the present embodiment, multiple region indicator units 15*a*, for example, three region indicator units 15*a* are provided. The number of the region indicator units 15*a* is not particularly limited.

<Power Receivable Region R1>

The power receivable region R1 is a region in which the power receiving device 20 can receive the power transfer signal W1 as the received power P1 that is greater than or equal to a specified threshold P3. The power receivable region R1 is a region within an assumed use region A1. The assumed use region A1 is, for example, a region in which the power receiving device 20 or the power supply target 100 accommodating the power receiving device 20 is placed. The assumed use region A1 may be, for example, a fixed surface such as a ground surface, a floor surface, and a wall surface, or a surface of a movable article such as a piece of furniture or a base.

<Threshold P3>

The threshold P3 is, for example, greater than or equal to an assumed power consumption P4, which is assumed to be consumed by the power supply target 100. The assumed power consumption P4 may be changed, for example, in accordance with the purpose of the power supply to the power supply target 100. Specifically, the assumed power consumption P4 is standby power, driving power, maximum power consumption, or the like of the power supply target 100. In the present embodiment, the threshold P3 has multiple values. Each value of the threshold P3 is set to a different value for each power supply target 100, for example. The transmission-side controlling unit 16, which will be discussed below, stores information related to the threshold P3 in a transmission-side memory unit 18. The information related to the threshold P3 is, for example, the usage of power supply at the received power P1 greater than or equal to the assumed power consumption P4, or the assumed type of the power supply target 100. The values of the threshold P3 are not limited to be greater than or equal the assumed power consumption P4, but may be set to any values. The number of the values of the threshold P3 may be one.

In the present embodiment, the user can select one or more values of the threshold P3. The user can perform the selection using, for example, an operation terminal (not shown). In the following description, for illustrative purposes, selected one or more values of the threshold P3 will be referred to as selected thresholds P3*c*.

<Target Indicator Unit 15*b*>

As shown in FIG. 3, the target indicator units 15*b* are configured to emit the visible beams L. The target indicator units 15*b* are configured to change the mode in which the visible beams L are emitted. The target indicator units 15*b* of the present embodiment are configured to change the colors of the visible beams L. Specifically, the target indicator units 15*b* are configured to emit the visible beams L at least in red and green. The target indicator units 15*b* of the present embodiment are configured to change an emission direction of the visible beams L. As specific configurations for changing the emission mode of the visible beams L and a specific configuration for changing the emission direction, configurations similar to those listed in the description of the region indicator units 15*a* can be employed.

The target indicator units 15*b* are configured to emit the visible beams L in correspondence with the power receiving devices 20 to which contactless power supply using the power transfer signal W1 is performed. The target indicator units 15*b* of the present embodiment emit the visible beams L toward the power receiving devices 20. The target indicator units 15*b* may be devices that are simply switchable between ON and OFF. The target indicator units 15*b* is configured to irradiate the irradiation region R2 with the visible beams L. The emission region R2 is a region within the assumed use region A1. In the present embodiment, for illustrative purposes, the emission region R2 agrees with the power receivable region R1. In the present embodiment, multiple target indicator units 15*b*, for example, three target indicator units 15*b* are provided. Registration IDs that can be distinguished from each other are set for the respective target indicator units 15*b*. The registration IDs may be set in advance or may be updated when necessary.

The region indicator unit 15*a* and the target indicator unit 15*b* may be separate from each other or may be integrated with each other. If the region indicator unit 15*a* and the target indicator unit 15*b* are integrated, the region indicator unit 15*a* and the target indicator unit 15*b* are configured to be a single unit and share a single light source.

<Transmission-Side Controlling Unit 16, Transmission-Side Processing Unit 17, and Transmission-Side Memory Unit 18>

As shown in FIG. 1, the transmission-side controlling unit 16 includes a transmission-side processing unit 17 and the transmission-side memory unit 18. The transmission-side processing unit 17 may include, for example, a central processing unit (CPU), a graphics processing unit (GPU), or a digital signal processor (DSP). The transmission-side memory unit 18 includes a random-access memory (RAM) and a read-only memory (ROM). The transmission-side memory unit 18 stores programs for operating the power transmitting device 10. The transmission-side memory unit 18 stores program codes or commands configured to cause the transmission-side processing unit 17 to execute processes. The transmission-side memory unit 18, which is a computer-readable medium, includes any type of medium that is accessible by a general-purpose computer or a dedicated computer. The transmission-side processing unit 17 may include a hardware circuit such as an application specific integrated circuit (ASIC) and a field programmable gate array (FPGA). The transmission-side processing unit 17, which is processing circuitry, may include one or more processors that operate according to a computer program, one or more hardware circuits such as an ASIC and an FPGA, or a combination thereof.

The transmission-side controlling unit 16 is configured to control the mode in which the visible beams L are emitted by the region indicator units 15*a* and the target indicator units 15*b*. The transmission-side controlling unit 16 changes the mode in which the visible beams L are emitted by the region indicator units 15*a* and the target indicator units 15*b*, for example, by changing the mode in which the light sources of the region indicator units 15*a* and the target indicator units 15*b* are energized.

The transmission-side memory unit 18 stores the registration IDs of the target indicator units 15*b*. The transmission-side memory unit 18 stores a correspondence relationship between the position of the power receiving device 20 and the target indicator units 15*b* that emit the visible beams L to the power receiving device 20. The position of the power receiving device 20 is, for example, the position of the power receiving device 20 in the emission region R2. The correspondence relationship is generated by, for example, associating the registration ID for each target indicator unit 15*b* with the coordinates of a point in the emission region R2.

As shown in FIG. 3, as a concrete example, the emission region R2 may be divided into three regions: a first emission region R21, a second emission region R22, and a third emission region R23. The first emission region R21, the second emission region R22, and the third emission region R23 are divided based on the orientation in relation to the power transmitting device 10. The division of the emission region R2 is virtual. The number of the target indicator units 15*b* is three, which is equal to the number of divisions of the emission region R2. The coordinates of each point in the emission regions R21 to $R^{23}$ are associated with each of the three target indicator units 15*b*. If points are included in different ones of the emission regions R21 to R23, these points are associated with different target indicator units 15*b*. Each of the emission regions R21 to R23 is associated with closest one of the target indicator units 15*b*. The correspondence relationship can be expressed in the form of, for example, a sequence or a table.

<Contactless Power Supply Process>

A contactless power supply process, which is performed by the contactless power supply system 1, will now be described. The contactless power supply process is performed at the time of contactless power supply from the power transmitting device 10 to the power receiving device 20 using the power transfer signal W1. The contactless power supply process is performed individually for each power receiving device 20, for example.

Figure 4:
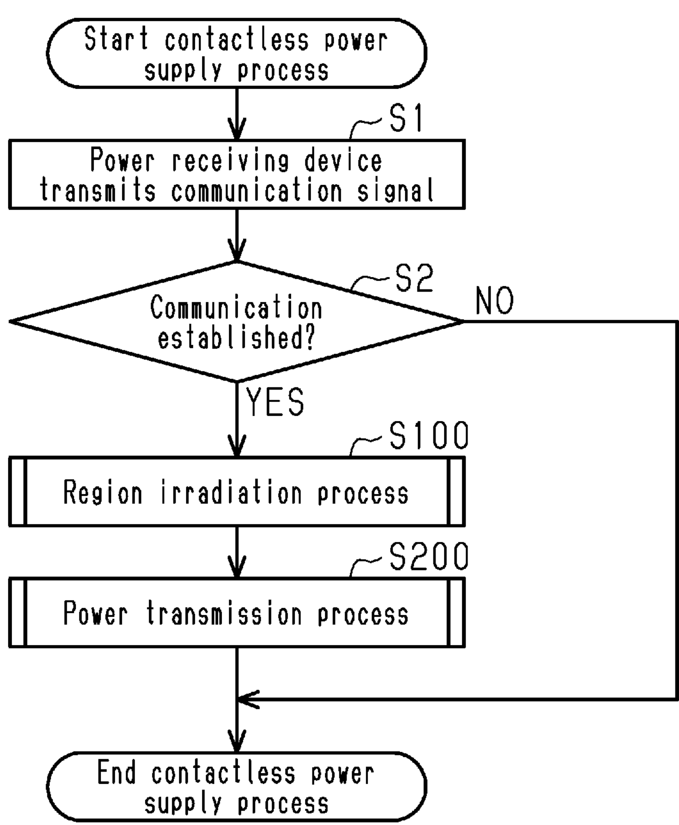
FIG. 4 is flowchart showing a contactless power supply process.

As shown in FIG. 4, the contactless power supply process includes a region irradiation process S100 and a power transmission process S200. The region irradiation process S100 is a process of irradiating the power receivable region R1 with the visible beams L using the region indicator units 15*a*. The power transmission process S200 is a process of transmitting power to the power receiving device 20 using the power transfer signal W1. The power transmission process S200 includes an irradiation process of irradiating, with the visible beams L, the power receiving device 20 to which power is being transmitted with the power transfer signal W1 using the target indicator unit 15*b*.

<Step S1>

First, in step S1, the power receiving device 20 transmits a specified communication signal W2 to the power transmitting device 10. When receiving the communication signal W2 transmitted from the power receiving device 20, the power transmitting device 10 transmits the communication signal W2 to the power receiving device 20. The power transmission-side controlling unit 16 and the power reception-side controlling unit 24 attempt to establish communication between the power transmitting device 10 and the power receiving device 20 by repeating such transmission and reception of the communication signal W2.

<Step S2>

Next, in step S2, the power transmission-side controlling unit 16 and the power reception-side controlling unit 24 determine whether communication has been established between the power transmitting device 10 and the power receiving device 20. For example, when the power transmitting device 10 receives the communication signal W2 transmitted from the power receiving device 20 in step S1 and the power receiving device 20 receives the communication signal W2 transmitted from the power transmitting device 10 in step S1, the transmission-side controlling unit 16 and the reception-side controlling unit 24 determine that communication has been established between the power transmitting device 10 and the power receiving device 20. In contrast, when the power transmitting device 10 has not received the communication signal W2 transmitted from the power receiving device 20 in step S1 or when the power receiving device 20 has not received the communication signal W2 transmitted from the power transmitting device 10 in step S1, the transmission-side controlling unit 16 and the reception-side controlling unit 24 determine that communication has not been established between the power transmitting device 10 and the power receiving device 20. The case in which communication has been established between the power transmitting device 10 and the power receiving device 20 is regarded as a case in which the power transmitting device 10 recognizes the presence of the power receiving device 20.

When the determination result in step S2 is negative, that is, when communication is not established between the power transmitting device 10 and the power receiving device 20, the transmission-side controlling unit 16 and the reception-side controlling unit 24 omit the region irradiation process S100 and the power transmission process S200, and end the contactless power supply process. In this case, the transmission-side controlling unit 16 and the reception-side controlling unit 24 do not emit the visible beams L to the power receivable region R1. Thus, the power transmitting device 10 reduces unnecessary power consumption when the presence of the power receiving device 20 is not recognized.

<Region Irradiation Process S100>

When the determination result in step S2 is affirmative, that is, when communication has been established between the power transmitting device 10 and the power receiving device 20, the transmission-side controlling unit 16 and the reception-side controlling unit 24 perform the region irradiation process S100.

<Step S101>

Figure 5:
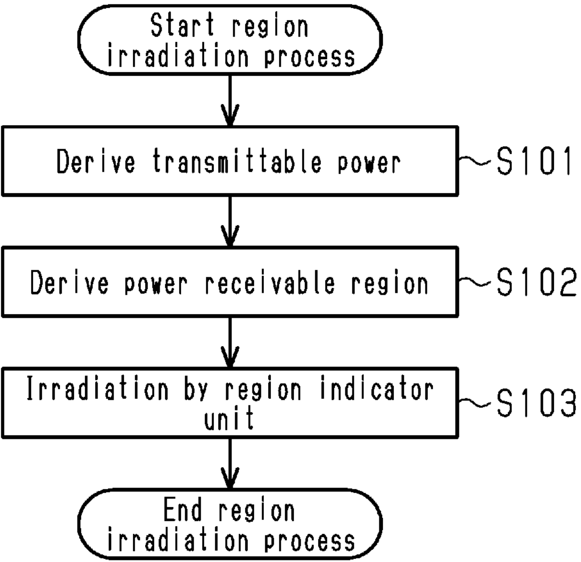
FIG. 5 is flowchart showing a region irradiation process.

As shown in FIG. 5, in the region irradiation process S100, the process of step S101 is first performed. In step S101, the transmission-side controlling unit 16 derives a transmittable power P2*c*. The transmittable power P2*c* is the maximum value of the transmitted power P2 that can be newly transmitted from the power transmitting device 10.

An example of a method of deriving the transmittable power P2*c* will now be described. First, the transmission-side controlling unit 16 acquires the total of the transmitted power P2 at the moment. For example, the transmission-side controlling unit 16 may treat the power supplied from the transmission-side power storage unit 11 to the transmission-side conversion unit 12 as the total of the transmitted power P2. Next, the transmission-side controlling unit 16 derives the transmittable power P2*c* by subtracting the total of the transmitted power P2 from a maximum transmitted power P2*m* of the power transmitting device 10. The maximum transmitted power P2*m* is a maximum value of the total of the transmitted power P2 that can be transmitted by the power transmitting device 10. The maximum transmitted power P2*m* may be set in accordance with the specific configuration of the power transmitting device 10.

<Step S102 (Region Deriving Unit)>

Next, in step S102, the transmission-side controlling unit 16 derives the power receivable region R1 based on the transmitted power P2. That is, in step S102, the transmission-side controlling unit 16 functions as a region deriving unit. In the present embodiment, the threshold P3 has multiple values. Therefore, the transmission-side controlling unit 16 derives power receivable regions R1 corresponding to the respective values of the threshold P3. Particularly, the transmission-side controlling unit 16 derives the power receivable regions R1 such that the power receivable region R1 is included in the assumed use region A1.

An example of a method of deriving the power receivable regions R1 will be now described. In this example, the region indicator units 15*a* are separated from a surface including the power receivable regions R1 by a first distance H1 in a direction orthogonal to that surface as shown in FIG. 2. The first distance H1 is regarded as the height of the region indicator units 15*a*.

First, the transmission-side controlling unit 16 derives a distance at which the transmitted power P2 agrees with the threshold P3. This distance can be adjusted in accordance with the antenna characteristics of the power transmitting antenna 13. The antenna characteristics include, for example, a gain and a radiation pattern. Next, the transmission-side controlling unit 16 derives a boundary region B1 based on the first distance H1 and the distance at which the transmitted power P2 agrees with the threshold P3.

As shown in FIG. 2, the boundary region B1 is a region in which the transmitted power P2 is equal to the threshold P3 in a surface including the power receivable regions R1. The transmission-side controlling unit 16 derives a region between the boundary region B1 and the power transmitting device 10 as the power receivable region R1. The power receivable region R1 and the boundary region B1 may be expressed in any form. For example, the power receivable region R1 and the boundary region B1 may be expressed as coordinates or the angle of elevation of the region indicator units 15*a*. The angle of elevation of the region indicator units 15*a* is an inclination of a direction in which the region indicator units 15*a* emit the visible beams L, for example, an optical axis, in relation to the installation surface of the power transmitting device 10. The installation surface of the power transmitting device 10 is, for example, a surface included in the assumed use region A1.

The above-described example illustrates the power receivable region R1 in a case in which there is no loss during power transmission, and the transmitted power P2 and the received power P1 agree with each other. However, in practice, a loss may occur during power transmission. In such a case, the transmitted power P2 attenuates as the distance from the power transmitting device 10 increases, and the received power P1 decreases as the distance from the power transmitting device 10 increases. When deriving the power receivable region R1, the transmission-side controlling unit 16 may derive the power receivable region R1 based on the transmitted power P2 and the loss. For example, the transmission-side controlling unit 16 derives a distance at which the received power P1 agrees with the threshold P3. The transmission-side controlling unit 16 derives the distance at which the received power P1 agrees with the threshold P3 based on the transmitted power P2 and the distance from the power transmitting device 10. The transmission-side controlling unit 16 derives the boundary region B1 based on the first distance H1 and the distance at which the transmitted power P2 agrees with the threshold P3. The transmission-side controlling unit 16 derives a region between the boundary region B1 and the power transmitting device 10 as the power receivable region R1.

When the derived power receivable region R1 is not entirely included in the assumed use region A1, the transmission-side controlling unit 16 defines part of the derived power receivable region R1 that is included in the assumed use region A1 as the power receivable region R1. Accordingly, the transmission-side controlling unit 16 derives the power receivable region R1 such that the power receivable region R1 is included in the assumed use region A1. The assumed use region A1 may be a preset region. Alternatively, when image data including the power transmitting device 10 is obtained by an image pickup device (not shown) or the like, the assumed use region A1 may be derived based on the obtained image data. For example, when the power transmitting device 10 is placed on a table, the image pickup device acquires image data including the table and the power transmitting device 10. The transmission-side controlling unit 16 obtains the image data and derives, as the assumed use region A1, the surface of the table on which the power transmitting device 10 is disposed.

The power receivable region R1 may be expressed in any form. For example, the power receivable region R1 may be expressed as relative coordinates of a point in the power receivable region R1 with respect to the region indicator units 15*a*, or as a direction from the region indicator units 15*a* toward a point in the power receivable region R1. Further, in step S102, the transmission-side controlling unit 16 does not need to derive the power receivable regions R1 corresponding to the respective values of the threshold P3, but may derive the power receivable region R1 that corresponds to only the selected threshold P3*c*. In addition, the transmission-side controlling unit 16 may derive only a power receivable region R1 that corresponds to one or more values of the threshold P3 that are greater than or equal to the maximum transmitted power P2*m*.

<Step S103 (Region Irradiating Unit)>

As shown in FIGS. 2 and 5, in step S103, the transmission-side controlling unit 16 uses the region indicator units 15*a* to emit the visible beams L toward at least a part of the power receivable region R1. That is, in step S103, the transmission-side controlling unit 16 functions as a region irradiating unit. A region in the power receivable region R1 to which the transmission-side controlling unit 16 emits the visible beams L using the region indicator units 15*a* includes at least a part of the boundary region B1 in which the power receiving device 20 can receive the power transfer signal W1 as the received power P1 of the threshold P3. In the present embodiment, the transmission-side controlling unit 16 emits the visible beams L toward at least a part of the power receivable region R1, which has been derived based on the selected threshold P3*c*. Specifically, the transmission-side controlling unit 16 emits the visible beams L toward the power receivable region R1 that corresponds to the selected threshold P3*c*, among the power receivable regions R1 derived in step S103. The transmission-side controlling unit 16 may omit the emission of the visible beams L to the power receivable region R1 that corresponds to the threshold P3 less than the maximum transmitted power P2*m*, specifically, the selected threshold P3*c*, which is less than the maximum transmitted power P2*m*.

When there are multiple selected thresholds P3*c*, the transmission-side controlling unit 16 uses the region indicator units 15*a* to emit visible beams L of different colors to the respective power receivable regions R1, which correspond to the selected thresholds P3*c*, respectively. The visible beams L having different colors are, for example, visible beams L having different wavelengths, intensities, or spectrums, allowing the user to recognize that the visible beams L have different colors. In addition, the visible beams L having different colors include the visible beams L of which irradiation conditions such as the irradiation times are different so that the user can recognize the colors are different. The transmission-side controlling unit 16 uses the region indicator units 15*a* to display information 200 on the power supply target 100 that be supplied with the received power P1 greater than or equal to the threshold P3. The information 200 related to the power supply target 100 is, for example, the name of the power supply target 100 that can be supplied with power by being arranged in the power receivable region R1, a figure or a symbol representing the power supply target 100, or the like.

As a concrete example, a case in which three values of the threshold P3 are selected will now be described. In the following description, for illustrative purposes, the power receivable regions R1 corresponding to three values of threshold P3, specifically, the selected thresholds P3*c*, will be referred to as a first power receivable region R11, a second power receivable region R12, and a third power receivable region R13. The selected threshold P3*c* that corresponds to the first power receivable region R11 is less than the selected threshold P3*c* that corresponds to the second power receivable region R12. The selected threshold P3*c* that corresponds to the second power receivable region R12 is less than the selected threshold P3*c* that corresponds to the third power receivable region R13. Therefore, the first power receivable region R11, the second power receivable region R12, and the third power receivable region R13 are arranged in descending order of the distance from the power transmitting device 10. The three region indicator units 15*a* emit the visible beams L respectively to the first power receivable region R11, the second power receivable region R12, and the third power receivable region R13. At this time, the region indicator units 15*a* emit the visible beams L to the respective power receivable regions R11 to R13 such that the visible beams L are included inside the assumed use region A1 derived in step S102. The region indicator units 15*a* emit the visible beams L to display, inside each of the power receivable regions R11 and R12, a character string having the name of the power supply target 100 ("XX" and "YY" in FIG. 2) and the character "chargeable" combined. The character strings correspond to the information 200 related to the power supply target 100 that can be supplied with the received power P1 greater than or equal to the threshold P3. The information 200 may be displayed in space by a hologram or the like.

<Power Transmission Process S200>

As shown in FIG. 5, after the process of step S103, the transmission-side controlling unit 16 ends the region irradiation process S100. Thereafter, as shown in FIG. 4, the transmission-side controlling unit 16 and the transmission-side processing unit 17 perform the power transmission process S200. If communication between the power transmitting device 10 and the power receiving device 20 is interrupted before the power transmission process S200 is performed, the transmission-side controlling unit 16 may omit the power transmission process S200 and end the contactless power supply process.

<Step S201>

Figure 6:
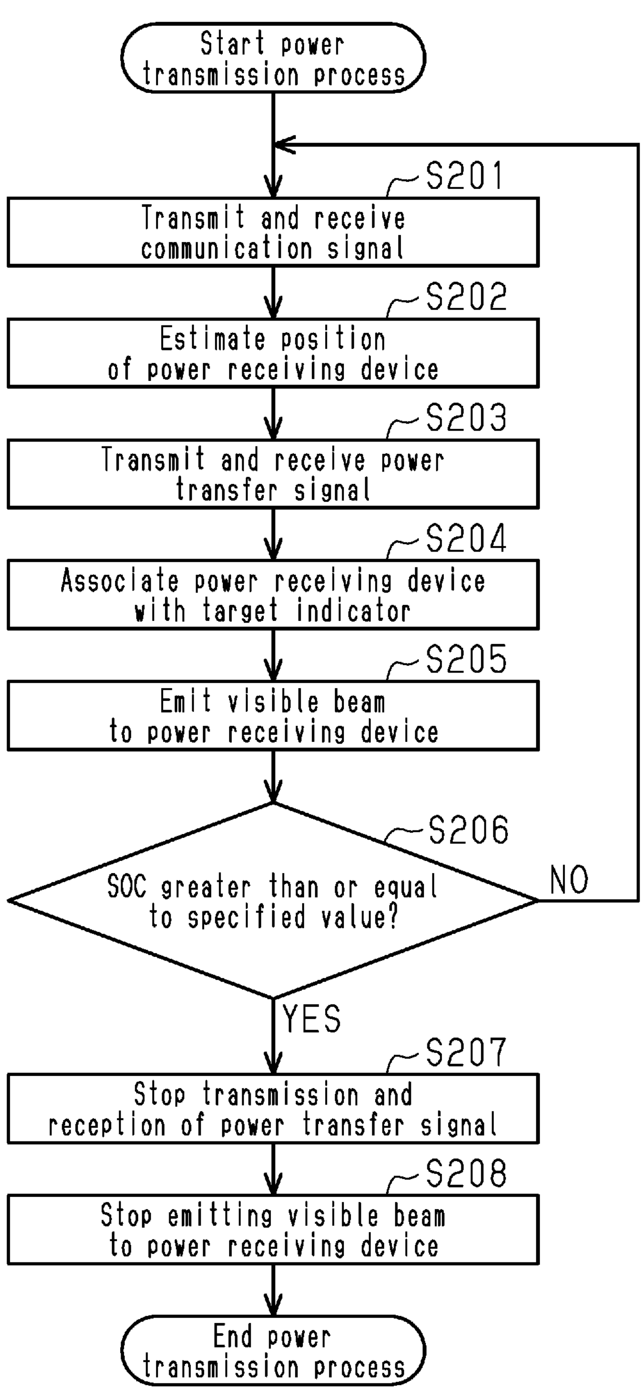
FIG. 6 is flowchart showing a power transmission process.

As shown in FIG. 6, the process of step S201 is first performed in the power transmission process S200. In Step S201, the contactless power supply system 1 performs transmission and reception of the communication signal W2. Specifically, the reception-side controlling unit 24 first transmits the communication signal W2 to the power transmitting device 10 using the power receiving antenna 21. The communication signal W2 includes information related to the charging status of the reception-side power storage unit 23 and the identification information of the power receiving device 20. Next, the transmission-side controlling unit 16 receives the communication signal W2 from the power receiving device 20 using the power transmitting antenna 13. Accordingly, the transmission-side controlling unit 16 recognizes the presence of the power receiving device 20. At this time, the transmission-side controlling unit 16 obtains the information related to the charging status of the reception-side power storage unit 23 and the identification information of the power receiving device 20 included in the communication signal W2. In this manner, the power transmitting device 10 and the power receiving device 20 communicate with each other via the communication signal W2.

<Step S202 (Position Estimating Unit)>

Next, in step S202, the transmission-side controlling unit 16 estimates the position of the power receiving device 20 with respect to the power transmitting device 10 based on the communication signal W2. The transmission-side controlling unit 16 thus functions as a position estimating unit in step S202. Specifically, the transmission-side controlling unit 16 estimates the direction of the communication signal W2 received by the power transmitting antenna 13 based on the direction dependence of the reception strength of the communication signal W2. The direction of the communication signal W2 received by the power transmitting antenna 13 corresponds to the direction of the power receiving device 20 with respect to the power transmitting device 10. The direction of the communication signal W2 received by the power transmitting antenna 13 is also referred to as the angle of arrival of the communication signal W2. The orientation of power receiving device 20 with respect to power transmitting device 10 represents the position of the power receiving device 20 with respect to the power transmitting device 10. The position of the power receiving device 20 with respect to the power transmitting device 10 may include the distance between the power transmitting device 10 and the power receiving device 20. The position of the power receiving device 20 with respect to the power transmitting device 10 may be represented by relative coordinates of the power receiving device 20 with respect to the power transmitting device 10. The position of the power receiving device 20 may be estimated by any method. For example, the position may be estimated using a received signal strength indicator (RSSI) of the communication signal W2 or using an image recognition method based on image data including the power transmitting device 10 and the power receiving device 20. When an antenna array is used as the power transmitting antenna 13, a method of estimating the position of the power receiving device 20 may be a method of estimating an angle of arrival from a signal phase difference when the communication signal W2 is received by multiple antennas.

<Step S203>

Next, in Step S203, the contactless power supply system 1 performs transmission and reception of the power transfer signal W1. Specifically, the transmission-side controlling unit 16 first transmits the power transfer signal W1 to the power receiving device 20. At this time, the transmission-side controlling unit 16 adjusts the orientation of the power transmitting antenna 13 so that the power transfer signal W1 is propagated to the position estimated in step S202. The reception-side controlling unit 24 receives the power transfer signal W1 transmitted from the power transmitting device 10. The received power transfer signal W1 is converted into the received power P1 by the reception-side conversion unit 22 and is stored in the reception-side power storage unit 23. This increases the SOC of the reception-side power storage unit 23. Some of the received power P1 may be supplied to the device 101.

<Step S204 (Associating Unit)>

Next, in step S204, the transmission-side controlling unit 16 associates the power receiving device 20 to which the contactless power supply is being performed with at least one of the target indicator units 15*b*. The transmission-side controlling unit 16 thus functions as an associating unit in step S204. Based on the identification information obtained from the communication signal W2, the transmission-side controlling unit 16 associates the identification code of the power receiving device 20 with the registration ID of the target indicator unit 15*b*.

In the present embodiment, the transmission-side controlling unit 16 associates the identification code with the registration ID of the target indicator unit 15*b* that emits the visible beam L to the power receiving device 20, based on the position of the power receiving device 20 with respect to the power transmitting device 10 estimated in step S202 and the correspondence relationship stored in the transmission-side memory unit 18. As described above, the correspondence relationship is the correspondence relationship between the position of the power receiving device 20 and the target indicator unit 15*b* that emit the visible beam L to the power receiving device 20. Therefore, the transmission-side controlling unit 16 associates the power receiving device 20 with the target indicator unit 15*b* in accordance with the position of the power receiving device 20 using the correspondence relationship.

As shown in FIG. 3, the association between the power receiving device 20 and the target indicator unit 15*b* changes depending on which of the emission regions R21 to R23 includes the position of the power receiving device 20, which has been estimated in step S202. Therefore, the association between the power receiving device 20 and the target indicator unit 15*b* changes depending on which of the emission regions R21 to R23 includes the power receiving device 20 to which the contactless power supply is being performed.

<Step S205 (Target Irradiating Unit)>

As shown in FIG. 6, in step S205, based on the association in step S204, the transmission-side controlling unit 16 emits the visible beams L using the target indicator unit 15*b* corresponding to the power receiving device 20 to which the contactless power supply is being performed. That is, in step S205, the transmission-side controlling unit 16 functions as a target irradiating unit. The power receiving device 20 to which the contactless power supply is being performed is disposed in the emission region R2. The transmission-side controlling unit 16 performs the irradiation, for example, by projecting the visible beams L toward the target indicator unit 15*b* corresponding to the power receiving device 20. In this case, the transmission-side controlling unit 16 adjusts the direction of the visible beams L emitted from the target indicator unit 15*b* in accordance with the estimated position of the power receiving device 20. For example, the transmission-side controlling unit 16 emits the visible beams L from the target indicator unit 15*b* in a direction corresponding to the angle of arrival of the communication signal W2. The transmission-side controlling unit 16 may emit the visible beams L by simply turning on the light.

The transmission-side controlling unit 16 changes the irradiation mode of the visible beams L to the power receiving device 20 in accordance with the charging status. That is, in step S205, the transmission-side controlling unit 16 functions as a changing unit. For example, the transmission-side controlling unit 16 emits the visible beam L of the first color, for example, green, when the SOC of the reception-side power storage unit 23 is less than a specified value. When the SOC is greater than or equal to the specified value, the transmission-side controlling unit 16 emits the visible beam L of a second color different from the first color, for example, red. The specified value, which is not particularly limited, is set to, for example, an SOC corresponding to a fully charged state of the reception-side power storage unit 23. Accordingly, the user can determine whether the charging status of the power receiving devices 20 is the fully charged state based on the color of the visible beam L. The colors of the beams emitted by the target indicator units 15*b* are not particularly limited. In addition, the ranges of the charging status corresponding to the colors of the visible beams L are not limited to two ranges, i.e., the range of values less than the specified value and the range of values greater than or equal to the specified value, but may be changed. The charging statuses corresponding to these ranges can be distinguished by employing different modes of emission of the visible beams L.

<Step S206>

Next, in step S206, the transmission-side controlling unit 16 determines whether the SOC of the reception-side power storage unit 23 is greater than or equal to the specified value. The transmission-side controlling unit 16 can be regarded as a device that determines whether the charging status of the reception-side power storage unit 23 is the fully charged state in step S206. The transmission-side controlling unit 16 obtains the SOC of the reception-side power storage unit 23 from the BMS of the reception-side power storage unit 23 via the communication signal W2, for example.

If the determination result of Step S206 is negative, the contactless power supply system 1 returns to Step S201 and performs transmission and reception of the communication signal W2 again. The case in which the determination result of step S206 is negative is a case in which the contactless power supply to the power receiving device 20 can be continued, for example, a case in which the charging status of the reception-side power storage unit 23 has not reached the fully charged state. Therefore, the emission of the visible beams L is continued while the contactless power supply is performed. During this time, the processes of steps S201 to S206 are repeatedly executed.

When the power receiving device 20 is moved while the contactless power supply is performed, the position of the power receiving device 20 estimated in step S202 is changed. At this time, for example, if the estimated position is changed from the first emission region R21 to the second emission region R22, the association set in step S204 is changed from the association that was set in step S204 in the previous cycle. Thus, the target indicator unit 15*b* that emits visible beam L to the moved power receiving device 20 is changed. Therefore, the transmission-side controlling unit 16 of the present embodiment changes the mode in which the visible beam L is emitted to the power receiving device 20 in accordance with the position of the power receiving device 20 estimated in step S202.

<Step S207>

When the determination result of step S206 is affirmative, the contactless power supply system 1 stops transmission and reception of the power transfer signal W1. The case in which the determination result in step S206 is affirmative is, for example, a case in which the charging status of the reception-side power storage unit 23 has reached a fully charged state. The reception-side controlling unit 24 first instructs the power transmitting device 10 to stop transmitting of the power transfer signal W1. The instruction may be executed, for example, by including a stop signal in the communication signal W2 or by stopping transmission of the communication signal W2. Next, when receiving the instruction, the transmission-side controlling unit 16 stops transmission of the power transfer signal W1.

<Step S208>

Next, in step S208, the transmission-side controlling unit 16 stops emission of the visible beam L to the power receiving device 20. The transmission-side controlling unit 16 may continue to emit the visible beam L to the power receiving device 20 for a specified period of time after stopping transmission and reception of the power transfer signal W1 in step S207. As a result, the visible beam L is emitted to the power receiving device 20 until the period elapses after the contactless power supply by the power transfer signal W1 is stopped. Since the emission mode of the visible beam L is changed in accordance with the charging status of the reception-side power storage unit 23, the user can determine that the contactless power supply has ended by referring to the emission mode of the visible beams L.

After completion of the process in step S208, the contactless power supply systems 1 ends the power transmission process S200. Thereafter, as shown in FIG. 4, the contactless power supply system 1 ends the contactless power supply process.

<Operation and Advantages>

(1) The power transmitting device 10 performs contactless power supply using the power transfer signal W1 to the power receiving device 20 that supplies power to the power supply target 100. The transmission-side controlling unit 16 performs the process of step S102 of deriving the power receivable region R1 based on the transmitted power P2, and the process of step S103 of emitting the visible beam L toward at least a part of the power receivable region R1 using the region indicator unit 15*a*.

With this configuration, the light emitted from the region indicator unit 15*a* is emitted to the power receivable region R1. The light emitted from the region indicator unit 15*a* is the visible beam L. Thus, the user can visually recognize the power receivable region R1 as a region irradiated with the visible beam L. Therefore, it is possible to provide the power transmitting device 10 that allows the user to easily recognize the power receivable region R1.

(2) A region in the power receivable region R1 to which the region indicator unit 15*a* emits the visible beam L includes the boundary region B1, in which the power receiving device 20 can receive the power transfer signal W1 as the received power P1 of the threshold P3.

With this configuration, the boundary region B1 is an outer edge at which the power receiving device 20 can receive the received power P1 greater than or equal to the threshold P3. In this case, for example, when the user places the power receiving device 20 at a position closer to the power transmitting device 10 than the boundary region B1, the power receiving device 20 can receive the received power P1 greater than or equal to the threshold P3. Therefore, the user easily recognizes the outer edge of the power receivable region R1.

(3) The threshold P3 has multiple values. In step S103, the transmission-side controlling unit 16 emits the visible beams L toward at least a part of the power receivable region R1, which has been derived based on the selected thresholds P3*c*.

With this configuration, the visible beams L are emitted to the power receivable region R1 that corresponds to the selected threshold P3*c* that is selected in accordance with the required received power P1, for example. Therefore, the range irradiated with the visible beams L can be adjusted in accordance with the received power P1 required for the power receiving device 20. Therefore, the user easily recognizes the power receivable region R1 that corresponds to the power receiving device 20.

(4) The region indicator units 15*a* are configured to emit the visible beams L in different colors. When there are multiple selected thresholds P3*c*, the transmission-side controlling unit 16 emits, in step S103, the visible beams L of different colors to the respective power receivable regions R1, which correspond to the selected thresholds P3*c*, respectively.

Accordingly, the user can distinguish different power receivable regions R1 corresponding to the respective selected thresholds P3*c* according to different colors. Therefore, it is easy to arrange the power receiving device 20 in a region in which contactless power supply is possible in correspondence with the received power P1 that corresponds to the selected threshold P3*c*.

(5) The threshold P3 is greater than or equal to the assumed power consumption P4, which is assumed to be consumed by the power supply target 100.

Even when contactless power supply is being performed, the power supply target 100 may consume the power stored in the power receiving device 20. For example, there is a case in which the standby power of the power supply target 100 is procured from the power stored in the reception-side power storage unit 23. When the power consumed by the power supply target 100 exceeds the received power P1, the power stored in the power receiving device 20 decreases even if the contactless power supply is being performed. Thus, the contactless power supply may never be completed. Specifically, when the SOC of the reception-side power storage unit 23 decreases even if contactless power supply is being performed, the determination result of step S206 remains negative. As a result, the transmission-side controlling unit 16 continues to transmit the power transfer signal W1 to the power receiving device 20.

In this regard, the threshold P3 of the present configuration is greater than or equal to the assumed power consumption P4, which is assumed to be consumed by the power supply target 100. As a result, by disposing the power receiving device 20 in the power receivable region R1 that corresponds to the threshold P3, the power consumed by the power supply target 100 is prevented from exceeding the received power P1.

(6) In step S205, the transmission-side controlling unit 16 uses the region indicator units 15*a* to display the information 200 related to the power supply target 100 that can be supplied with power with the received power P1 that is greater than or equal to the threshold P3.

With this configuration, the user can identify the power receiving device 20 that can be wirelessly supplied with power by being disposed in the power receivable region R1, based on the visible beams L emitted from the region indicator units 15*a*. This improves the convenience for the user.

(7) The power receiving device 20 is accommodated in the interior of the power supply target 100. In Step S205, based on the association between the region indicator unit 15*a* and the power receiving device 20, the transmission-side controlling unit 16 emits the visible beam L using the region indicator unit 15*a* that corresponds to the power receiving device 20 to which the contactless power supply is being performed. At this time, in step S205, the transmission-side controlling unit 16 changes the mode in which the visible beam L is emitted to the power receiving device 20 in accordance with the charging status of the reception-side power storage unit 23.

Since the power receiving device 20 is accommodated inside the power supply target 100, the user cannot easily visually recognize the power receiving device 20 as compared to a case in which the power receiving device 20 is exposed. Accordingly, for example, even if the power receiving device 20 includes a member that notifies the user of the charging status of the power receiving device 20, the user may have difficulty in visually recognizing the notification from that member.

In this regard, with the above-described configuration, even in a situation in which the user cannot visually recognize the power receiving device 20 because the power receiving device 20 is accommodated inside the power supply target 100, the user can acquire the charging status of the power receiving device 20 to which the contactless power supply is being performed, based on changes in the mode in which the visible beams L are emitted from the target indicator units 15*b* of the power receiving device 20. Therefore, regardless of whether the power receiving device 20 is visible, the user can acquire the charging status of the power receiving device 20.

(8) The communication signal W2 includes information related to the position of the power receiving device 20 with respect to the power transmitting device 10. Multiple target indicator units 15*b* are provided. The transmission-side memory unit 18 stores a correspondence relationship between the position of the power receiving device 20 and the target indicator units 15*b* that emit the visible beams L to the power receiving device 20. In step S204, the transmission-side controlling unit 16 associates the power receiving device 20 with the target indicator unit 15*b* that emits the visible beam L, based on the positions of the power receiving device 20 estimated in the process of step S202 and the correspondence relationship.

With this configuration, the target indicator unit 15*b* that emits the visible beam L to the power receiving device 20 is changed depending on the position of the power receiving device 20. For example, when the power receiving device 20 moves while the contactless power supply is being performed, the position of the power receiving device 20 changes. Depending on the change in the position of the power receiving device 20, the target indicator unit 15*b* emitting the visible beam L to the power receiving device 20 is switched before and after the movement. Therefore, the target indicator unit 15*b* that indicates the charging status of the power receiving device 20 changes in accordance with the position of the power receiving device 20. The user can easily and intuitively acquire which of the target indicator units 15*b* indicates the charging status of which power receiving device 20.

(9) The emission modes of the visible beams L include at least one of the intensity of the visible beams L, the color of the visible beams L, and the emission time of the visible beams L.

This configuration allows the user to readily visually recognize changes in the mode in which the visible beams L are emitted.

(10) When communication between the power transmitting device 10 and the power receiving device 20 is not established, the transmission-side controlling unit 16 does not emit the visible beams L to the power receivable region R1.

With this configuration, when communication with the power receiving device 20 is not established, there is little need to perform contactless power supply. The case in which communication with the power receiving device 20 is not established is, for example, a case in which no power receiving device 20 is present in the vicinity of the power transmitting device 10. In such a case, the power consumption of the power transmitting device 10 can be reduced by not emitting the visible beams L from the region indicator unit 15*a*.

<Modifications>

The above-described embodiment may be changed as described below. The above-described embodiment and the following modifications can be combined as long as the combined modifications remain technically consistent with each other.

The region irradiation process S100 and the power transmission process S200 may be performed as independent processes. The region irradiation process S100 and the power transmission process S200 may be performed concurrently.

The region indicator units 15*a* and the target indicator units 15*b* are distinguished from each other for the sake of convenience. For example, the transmission-side controlling unit 16 may cause the region indicator units 15*a* to function as target indicator units 15*b*, or may cause the target indicator units 15*b* to function as region indicator units 15*a*.

The assumed use region A1 is not limited to a smooth surface, but may be an uneven surface including steps or recesses and protrusions. If the power receivable region R1 includes recesses and protrusions, the transmission-side controlling unit 16 may adjust the power receivable regions R1 derived in step S102 in accordance with the recesses and protrusions. For example, if the power receivable region R1 includes a section having a protrusion, which protrudes from a reference section, the transmission-side controlling unit 16 enlarges the power receivable region R1 in that section as compared to sections without such a protrusion. In contrast, if the power receivable region R1 includes a section having a recess, which is recessed from the reference section, the transmission-side controlling unit 16 reduces the power receivable region R1 in that section as compared to sections without such a recess. The method of recognizing the recesses and protrusions is not particularly limited. For example, the transmission-side memory unit 18 may store map data representing the situation around the power transmitting device 10, and the transmission-side controlling unit 16 may recognize recesses and protrusions based on the map data. In addition, the transmission-side controlling unit 16 may recognize recesses and protrusions based on image data acquired from an image pickup device (not shown).

In step S205, the transmission-side controlling unit 16 may change the mode in which the visible beams L are emitted in accordance with a parameter other than the SOC of the reception-side power storage unit 23, such as the charging efficiency, the presence or absence of an anomaly during charging, and the progress status of charging. The charging efficiency is, for example, a value obtained by dividing the received power P1 by the transmitted power P2. Anomalies during charging include, for example, interruption of the contactless power supply process such as interruption of communication between the power transmitting device 10 and the power receiving device 20 while the power transmission process S200 is performed. The progress status of charging includes a state in which the power transmission process S200 is not being performed even when communication between the power transmitting device 10 and the power receiving device 20 has been established. Examples of such a case include a case in which the contactless power supply to some of the power receiving devices 20 is stopped due to a decrease in the transmittable power P2*c* during the contactless power supply to the power receiving devices 20.

The power transmitting device 10 may cause the region indicator units 15*a* and the target indicator units 15*b* to emit the visible beams L regardless of whether communication with the power receiving device 20 has been established. In this case, for example, the process of step S2 is omitted.

The mode in which the visible beams L are emitted is not limited to the intensity, the color, or the emission time. For example, the mode in which the visible beams L are emitted may include the polarization state or the directivity of the visible beams L.

The transmission-side controlling unit 16 may cause the target indicator units 15*b* to emit the visible beams L irrespective of the position of the power receiving device 20. For example, the transmission-side controlling unit 16 may fix the target indicator unit 15*b* that is associated with the power receiving device 20 in step S204. In this case, when associating the power receiving device 20 with the target indicator unit 15*b* in step S204, the transmission-side controlling unit 16 does not necessarily need to use the correspondence relationship between the position of the power receiving device 20 and the target indicator unit 15*b* that emits the visible beam L to the power receiving device 20. Further, the transmission-side memory unit 18 does not necessarily need to store the correspondence relationship. In this case, regardless of the position of the power receiving device 20, the target indicator unit 15*b* that has been associated with the power receiving device 20 once in step S204 emits the visible beam L to the power receiving device 20.

In step S208, when the power receiving device 20 moves from the emission region R2 after the contactless power supply with the power transfer signal W1 is stopped, the transmission-side controlling unit 16 may stop irradiating the power receiving device 20 with the visible beam L before a specified period of time elapses after transmission and reception of the power transfer signal W1 is stopped. The transmission-side controlling unit 16 may stop the emission of the visible beam L when the position of the power receiving device 20 cannot be estimated or the presence of the power receiving device 20 cannot be recognized in step S202.

The target indicator units 15*b* may be omitted. When the target indicator units 15*b* are omitted, the processes of steps S204, S205, and S208 may be omitted in the power transmission process S200.

In step S103, the transmission-side controlling unit 16 does not necessarily need to display the information 200 related to the power supply target 100 using the region indicator units 15*a*.

The configuration of the region indicator units 15*a* is not particularly limited. For example, the region indicator units 15*a* do not necessarily need to be configured to emit the visible beams L of multiple colors, but may emit a visible beam L of a single color.

The mode in which the selected thresholds P3*c* are selected is not particularly limited. For example, the transmission-side controlling unit 16 may select the selected thresholds P3*c* based on the information 200 related to the power supply target 100 included in the communication signal W2.

The number of the values of the threshold P3 is not particularly limited, and may be one.

The transmission-side controlling unit 16 is not limited to one that irradiates the boundary region B1 with the visible beams L using the region indicator units 15*a*. For example, the transmission-side controlling unit 16 may use the region indicator units 15*a* to emit the visible beams L to the power receivable region R1 except for the boundary region B1.

Contactless power supply may be performed in a state in which the power receiving device 20 is not accommodated in the power supply target 100.

The power receiving device 20 does not necessarily need to include the reception-side power storage unit 23. In this case, the power receiving device 20 supplies all the received power P1 to the device 101.

The power receiving device 20 may be fixed to a power supply target 100 that does not include a member for displaying the charging status of the power receiving device 20.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A power transmitting device configured to perform contactless power supply using a power transfer signal to a power receiving device that supplies power to a power supply target, the power transmitting device comprising:
- a power transmitting antenna configured to transmit the power transfer signal to the power receiving device;
- a region indicator unit configured to emit a visible beam; and
- processing circuitry configured to:
  - based on a transmitted power that is transmitted as the power transfer signal, derive a power receivable region, in which the power receiving device is capable of receiving the power transfer signal as a received power greater than or equal to a specified threshold, and
  - use the region indicator unit to emit the visible beam toward at least a part of the power receivable region, wherein
- the specified threshold is one of thresholds,
- the power receivable region is one of power receivable regions that respectively correspond to the thresholds,
- the processing circuitry is configured to derive at least one of the power receivable regions corresponding to at least one selected threshold of the thresholds,
- the processing circuitry is further configured to use the region indicator unit to display, inside each of the power receivable regions, information related to the power supply target, and
- the information related to the power supply target includes information visually indicating, to a user, the power supply target that is capable of being supplied with the received power greater than or equal to a threshold, of the thresholds, corresponding to each of the power receivable regions.

2. The power transmitting device according to claim 1, wherein a section in the power receivable region to which the region indicator unit emits the visible beam includes a boundary region in which the power receiving device is capable of receiving the power transfer signal as the received power of the specified threshold.

3. The power transmitting device according to claim 1, wherein the region indicator unit is configured to emit visible beams in different colors, and the processing circuitry is configured to emit the visible beams in different colors to the power receivable regions, respectively.

4. The power transmitting device according to claim 1, wherein the specified threshold is greater than or equal to an assumed power consumption, which is assumed to be consumed by the power supply target.

5. The power transmitting device according to claim 1, wherein the power receiving device is accommodated in an interior of the power supply target, the power receiving device includes:

a reception-side power storage unit configured to be charged with the received power; and a reception-side communication unit that communicates with the power transmitting device through transmission and reception of a communication signal, the communication signal includes information indicating a charging status of the reception-side power storage unit, the power transmitting device includes:

a transmission-side communication unit that communicates with the power receiving device through transmission and reception of the communication signal; and a target indicator unit that emits a visible beam, and the processing circuitry is configured to:

use the target indicator unit to emit the visible beam to the power receiving device to which the contactless power supply is being performed, and in accordance with the charging status, change a mode in which the target indicator unit emits the visible beam to the power receiving device.

6. The power transmitting device according to claim 5, wherein the communication signal includes information related to a position of the power receiving device in relation to the power transmitting device, the target indicator unit is one of target indicator units, the power transmitting device includes a transmission-side memory unit that stores a correspondence relationship between the position of the power receiving device and the target indicator unit, and the processing circuitry is configured to estimate the position of the power receiving device in relation to the power transmitting device based on the communication signal, associate the power receiving device with one of the target indicator units based on the position that is estimated of the power receiving device and the correspondence relationship, and use the target indicator unit associated with the power receiving device to emit the visible beam.

7. The power transmitting device according to claim 5, wherein the mode in which the target indicator unit emits the visible beam includes at least one of an intensity of the visible beam, a color of the visible beam, and an emission time of the visible beam.

8. The power transmitting device according to claim 1, wherein the processing circuitry is configured to not emit the visible beam to the power receivable region when communication between the power transmitting device and the power receiving device is not established.

9. The power transmitting device according to claim 1, wherein the information related to the power supply target includes a character, a symbol, and/or a figure representing the power supply target.

10. The power transmitting device according to claim 1, wherein the information related to the power supply target includes at least character string representing the power supply target.

* * * * *